Jan. 26, 1965     M. L. WOOD, JR     3,166,857
EDUCATIONAL DEVICE
Filed March 7, 1962                                    2 Sheets-Sheet 1
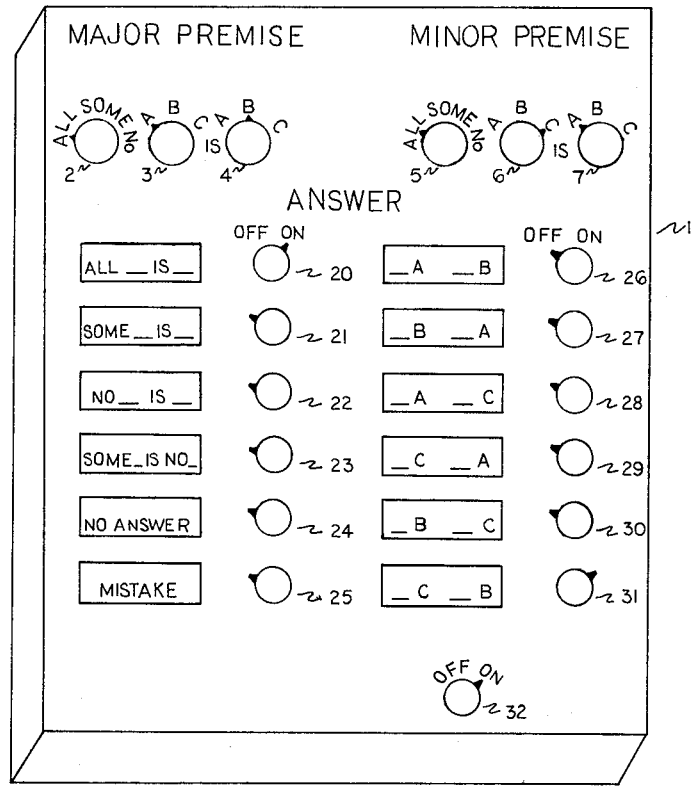
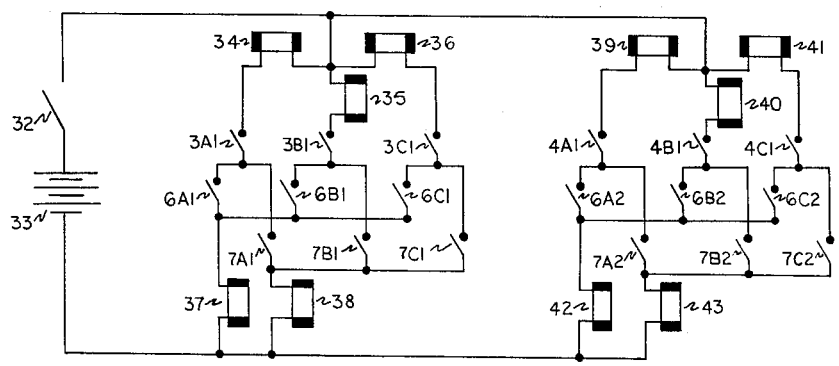
INVENTOR.
MARION LOREN WOOD JR
BY Edward S. Drake
AGENT

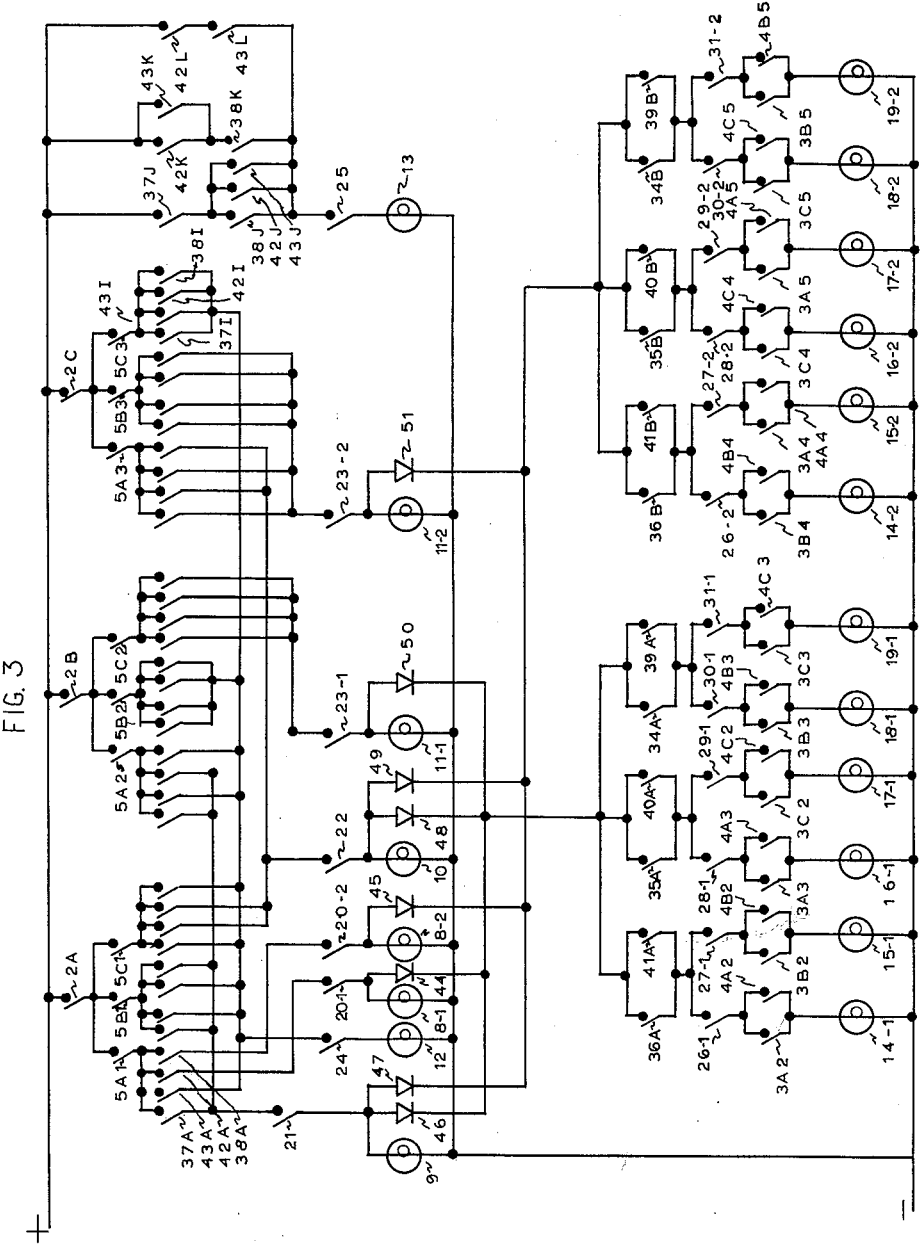

United States Patent Office 3,166,857
Patented Jan. 26, 1965

3,166,857
EDUCATIONAL DEVICE
Marion Loren Wood, Jr., 220 Hunter Ave.,
North Tarrytown, N.Y.
Filed Mar. 7, 1962, Ser. No. 178,037
7 Claims. (Cl. 35—9)

The present invention relates to an educational device and particularly to such a device capable of functioning according to the method of syllogistic logic.

In the field of education it is becoming increasingly important to provide tools that will make the learning process more efficient and speedy. Various types of educational or teaching machines are known in the art. As instruments for testing the student's ability to recall facts, they are proving useful in such learning areas as arithmetic and history. The present invention fills an important gap in the educational machine field by extending the field of testing and problem solving.

Accordingly, the principal object of this invention is to provide a device capable of solving problems in the field of logic.

Another object of this invention is to provide an educational device for teaching logic according to the syllogistic method.

Still another object of this invention is to provide an educational device for determining and indicating the exact relationship between two premises.

These objects are achieved by a device having two groups of panel switches for setting up two premises, designated MAJOR and MINOR. Each group permits an operator to set up the "condition" and two "terms" of a premise. Electric circuits controlled by these switches permit certain panel lights to be illuminated to indicate the exact relationship between the two premises. By adjusting a switch associated with each panel light position the operator is permitted to choose what is believed to be the correct answer. However, the operator may select to read the answers to problems automatically by simply placing all the light control switches in the ON position. By connecting a number of such educational devices to a central station a check can be maintained on the operator's performance.

The various novel features which contribute to the successful operation of this invention will be made more apparent in the following description and drawings of one preferred embodiment thereof.

In the drawings,

FIG. 1 shows the front panel of the educational device in accordance with the teachings of the present invention;

FIG. 2 shows the term set-up circuit; and

FIG. 3 shows the condition set-up and indicator circuits.

In FIG. 1 the front panel 1 contains two groups of three-position switches for setting up a problem in the field of logic. Manual switches 2, 3 and 4 permit the condition, first term and second term, respectively, of the MAJOR PREMISE to be set up. Similar switches, 5, 6 and 7 perform identical functions for the MINOR PREMISE. As the switches are shown arranged, the problem presented to the device is "All A is B, and all C is A."

Every conceivable logical relationship can be established between two terms with the switching arrangement shown in FIG. 1. Each condition set-up switch may be placed in position ALL, SOME or NO, and each term set-up switch may be placed in position A, B or C. Of course, not all combinations of switch settings provide a logical answer, as will be considered below.

The ANSWER portion of the front panel has two columns of indicator light positions and light control switches. The left column, beginning with ALL___IS___, provides the condition part of the answer, and the right column, beginning with ___A___B, provides the term part of the answer. Associated with each of the twelve indicator positions is a light control switch 20–31. These switches offer the operator the choice of obtaining the answer automatically or of trying to solve the problem presented by the condition and term set-up switches. For automatic reading all light control switches are initially placed in the ON position; for problem solving they are placed in the OFF position. In the latter case, assuming that there is a logical answer and no mistake has been made, the operator selects the answer by turning ON a switch in each column. Should the operator believe that there is no answer, then only switch 24 is turned ON. Switch 25 may be kept ON at all times to indicate when a mistake occurs in setting up a problem or in the operation of the device.

For example, referring to the problem above that has been presented to the device, that is "All A is B, and all C is A," the correct answer is selected by turning switches 20 and 31 to the ON position. The indicator positions ALL___IS___ and ___C___B are illuminated to indicate the answer, which is read "All C is B." Wrong selection by the operator will fail to indicate the illumination of any ANSWER position.

Switch 32 controls the application of power to the entire device. It is understood that some external power source with local or remote control may be used.

The circuit for setting up the terms of the problem is shown in FIG. 2. The closure of switch 32 connects power source 33 to the circuits of FIGS. 2 and 3. In the case of FIG. 2 one of four principal circuit paths is closed through contacts of switches 3, 4, 6 and 7 when a problem has been presented to the device. Each circuit path represents a basic relationship between the terms of the two premises.

One circuit path, which includes relay 37, is energized when the switch setting of the first term of the MAJOR PREMISE is the same as the switch setting of the first term of the MINOR PREMISE. When these two terms are identical, both switches 3 and 6 are set in the A, B or C position. In the A position switch contacts 3A1 and 6A1 are closed. Thus a circuit path is closed through switch 32, relay coil 34, and contacts 3A1 and 6A1 to energize relay coil 37. In the B position contacts 3B1 and 6B1 are closed, thereby causing relay 37 to be energized through relay coil 35. In the C position contacts 3C1 and 6C1 are closed, thereby energizing relay 37 through relay coil 36.

Another major circuit path, which includes relay 38, is energized when the switch setting of the first term of the MAJOR PREMISE is the same as that of the second term of the MINOR PREMISE. In this case switches 3 and 7 are set in the A, B or C position. In the A position relay 38 is energized through contacts 7A1 and 3A1 and relay coil 34. In the B position relay 38 is energized through contacts 7B1 and 3B1 and relay coil 35. In the C position relay 38 is energized through contacts 7C1 and 3C1 and relay coil 36.

The third major circuit path, which includes relay 42, is closed when the switch setting of the second term of the MAJOR PREMISE and that of the first term of the MINOR PREMISE are identical. In this case switches 4 and 6 are set in the A, B or C position. Relay 42 is energized when the A, B or C contacts of these two switches are closed. One of the relays 39, 40 and 41 is thereby caused to be energized.

The last major circuit path, which includes relay 43, is closed when the switch setting of the second term of the MAJOR PREMISE and that of the second term of the MINOR PREMISE are identical. In such a case switches 4 and 7 are in the A, B or C position. Relay 43 is then energized through the A, B or C contacts of these switches and one of the relay coils 39, 40 and 41.

In the normal operation of the term circuit only one of the four major circuit paths is closed at any time. Whenever any two of the relays 37, 38, 42 and 43 are energized simultaneously, a mistake exists in the device and the MISTAKE position on the front panel is illuminated. The manner in which these relays determine the illumination of all ANSWER positions will be discussed below.

Referring to FIG. 3 it may be seen that a plurality of circuit paths formed by the contacts of the condition set-up switches 2 and 5 and of the relays in FIG. 2 serve to energize the indicator lights 8–13 which illuminate the ANSWER positions on the front panel. Contacts 2A, 2B and 2C are closed when condition set-up switch 2 is in the ALL, SOME and NO positions, respectively. In the same way the adjustment of condition set-up switch 5 brings about the closure of multiple contacts 5A1–3, 5B1–3 and 5C1–3. Each contact of the condition switch of the MAJOR PREMISE is connected to a set of A, B and C contacts of the condition switch of the MINOR PREMISE.

Each contact of the MINOR PREMISE condition switch is connected to a group of four contacts controlled by relays 37, 38, 42 and 43. The first group of such contacts, 37A, 38A, 42A and 43A, are shown connected to contact 5A1 of switch 5. The last such group, contacts 37I, 38I, 42I and 43I, is connected to switch contact 5C3. The energization of the indicator lights which illuminate the condition ANSWER positions thus depends on the setting of the two condition switches and a pair of term switches which bear a certain relationship to each other, as explained above.

The condition ANSWER position ALL__IS__ on the front panel is illuminated when indicator light 8–1 or 8–2 is energized. Light 8–1 is energized when the two condition switches are in the ALL position and relay 42 is energized. For light 8–2 to be energized the two must also be in the ALL position, but relay 38 must now be energized. Diodes 44 and 45, associated with these two lights, permit the succeeding circuits to be energized and prevent the associated lights from being operated erroneously.

The condition ANSWER position SOME__IS__ on the front panel is illuminated when indicator light 9 is energized. This occurs when various circuit paths are closed. One such circuit path includes switch contact 21, relay contact 37A and switch contacts 5A1 and 2A. As in the case of contacts 20–1 and 20–2 which control the energization of lights 8–1 and 8–2 respectively, contact 21 may be initially in the closed position when the problem is presented to the device. Diodes 46 and 47 perform functions similar to those of diodes 44 and 45 mentioned above.

Through various circuit paths light 10 illuminates condition ANSWER position NO__IS__, lights 11–1 and 11–2 illuminate position SOME__IS NOT__ and light 12 illuminates position NO ANSWER. Diodes 48–51, associated with all the lights except light 12, permit succeeding circuits to be energized. Manual switches 22, 23 and 24, when turned ON, permit lights 10, 11–1, 11–2 and 12 to be energized.

The condition ANSWER position MISTAKE is illuminated by indicator light 13 when any pair of the relays 37, 38, 42 and 43 is energized simultaneously. When relay 37 is one of the two relays erroneously energized, light 13 is energized through a circuit path formed by contact 37J and one of the contacts 38J, 42J and 43J. When relay 37 is not energized and, instead, relay 38 is one of the two erroneously energized relays, light 13 is energized through contact 38K and one of the contacts 42K and 43K. Finally energization of light 13 may occur when relays 42 and 43 are energized simultaneously.

In any case it is understood that front panel switch 25 is closed.

Proceeding now to the term ANSWER position circuit it may be seen that there are two principal paths for energizing the indicator lights. In each path are six parallel circuits which energize the six different lights that illuminate the term ANSWER positions on the front panel. For example, the term ANSWER position __A__B is illuminated by either light 14–1 or light 14–2. The former light is energized through circuit path 3A2, 26–1 and 41A or circuit path 4A2, 26–1 and 36A. The first path for energizing light 14–1 is closed when switch 3 is in position A and relay 41 is energized. The second path is closed when switch 4 is in position A and relay 36 is energized. Light 14–2 is activated through circuit path 3B4, 26–2 and 41B or path 4B4, 26–2 and 36B. Now switch 3 or 4 must be in position B. Front panel switch 26 must be ON to permit lights 14–1 and 14–2 to be energized.

In a similar way term ANSWER position __B__A is illuminated by lights 15–1 and 15–2, position __A__C__ by lights 16–1 and 16–2, position __C__A by lights 17–1 and 17–2, position __B__C by lights 18–1 and 18–2 and __C__B by lights 19–1 and 19–2. Energization of these indicator lights is determined by the settings of manual switches 3 and 4 and the closure of certain contacts of relays 34, 35, 36, 39, 40 and 41. For lights 15–1 through 19–2 to be energized front panel switches 27–31 must be turned ON.

The operation of the educational device will now be considered with relation to the following specific problem.

MAJOR PREMISE: Countries with a high standard of living favor democracy.

MINOR PREMISE: Western European countries have a high standard of living.

In the language of the present device the same problem is stated in the following manner.

MAJOR PREMISE: All A is B.
MINOR PREMISE: All C is A.

Assuming that power switch 32 is turned ON, the problem is presented to the present device by placing the MAJOR PREMISE switches 2, 3 and 4 in positions ALL, A and B respectively and the MINOR PREMISE switches 5, 6 and 7 in positions ALL, C and A respectively. With the ANSWER position control switches 20–31 initially off, the operator selects the correct answer by adjusting switches 20 and 31 to the ON position. Immediately ANSWER positions ALL__IS__ and __C__B are illuminated, in accordance with the following circuit analysis.

Referring to FIG. 2 it will be seen that the present setting of the four term switches closes a single circuit path formed by switch contacts 3A1 and 7A1 and relay coils 34 and 38. It will be recalled that relay 38 is always energized when the first term of the MAJOR PREMISE is the same as the second term of the MINOR PREMISE. Furthermore, when the identical terms are A, relay 34 is energized.

With condition set-up switches 2 and 5 in position ALL, contacts 2A and 5A1 are closed. Since switch 20 has already been turned ON and relay 38 is energized, a circuit is closed through contacts 38A and 20–2 to energize light 8–2 in FIG. 3. Thus the condition ANSWER position ALL__IS__ becomes illuminated. Diode 45 conducts current through contacts 34B, 31–2 and 4B5 to energize light 19–2. Thus the term ANSWER position __C__B is illuminated.

With the ANSWER positions ALL__IS__ AND __C__B illuminated, the correct answer is read: ALL C IS B. Returning to the original problem, the machine answer is translated as "Western European countries favor democracy."

While I have shown and pointed out my invention as applied above, it will be apparent to those skilled in the art, that many modifications can be made within the scope and sphere of my invention in the claims which follow.

What is claimed is:

1. An educational device for solving problems in syllogistic logic involving a major premise and a minor premise, comprising first means for setting up the condition of the major premise, second means for setting up the first term of the major premise, third means for setting up the second term of the major premise, fourth means connected to said first means for setting up the condition of the minor premise, fifth means connected to both said second and third means for setting up the first term of the minor premise, sixth means connected to both said second and third means for setting up the second term of the minor premise, circuit means connected to said second, third, fifth and sixth means, and plural indicator means controlled by all said set up means and said circuit means to indicate the exact relationship between the two premises.

2. An educational device for solving problems in syllogistic logic involving two premises with each containing a condition and two terms, comprising first means for setting up the condition of the first premise, second means for setting up the terms of the first premise, third means connected to said first means for setting up the condition of the second premise, fourth means connected to said second means for setting up the terms of the second premise, circuit means connected to said second and fourth means, indicator means controlled by all aforesaid means to indicate the exact relationship between the two premises set up by said first through fourth means, and switching means series connected with said indicator means to select manually the indicator means which is believed to represent the exact relationship.

3. An educational device according to claim 2 wherein said indicator means includes two groups of indicating devices, one group to indicate all possible relationships between the conditions of the two premises and the other group to indicate all possible relationships between the terms of the two premises, and said switching means includes two associated groups of switches for selecting the desired pair of indicating devices which are believed to represent the correct relationship of the premises.

4. An educational device for solving problems in syllogistic logic involving a first premise and a second premise, with each premise having a condition and two terms, comprising a first group of manual switches for setting up the first premise, a second group of manual switches for setting up the second premise, with said second group being electrically connected to said first group, relay circuits connected to and controlled by certain switches in both groups, indicator lights for indicating all possible relationships between the first premise and the second premise, and a third group of manual switches series connected with said first and second groups and contacts of said relay circuits for selecting the indicator lights which are believed to represent the correct relationship between the premises.

5. An educational device according to claim 4 wherein each of said first and second groups of manual switches comprises a switch for setting up a condition and two identical switches for setting up two terms.

6. An educational device according to claim 5 wherein each condition switch sets up three conditions and each terms switch sets up three terms.

7. An educational device for solving problems in syllogistic logic involving a first premise and a second premise, each containing a condition and two terms, comprising the combination of switching means for setting up the condition of the first premise, switching means for setting up the first term of the first premise, switching means for setting up the second term of the first premise, switching means for setting up the condition of the second premise, switching means for setting up the first term of the second premise, switching means for setting up the second term of the second premise, first relay means controlled by said switching means for setting up the first term of the first premise and the first and second terms of the second premise, second relay means controlled by said switching means for setting up the second term of the first premise and the first and second terms of the second premise, first indicator means for indicating the exact relationship between the conditions of the first premise and the second premise, said indicator means being controlled by said switching means for setting up the conditions of the first premise and the second premise and said first and second relay means, second indicator means for indicating the exact relationship between the terms of the first premise and the second premise, said second indicator means being controlled by said switching means for setting up the conditions of the first premise and the second premise and said first and second relay means, and switching means for selecting the indicator means to be energized.

References Cited by the Examiner
UNITED STATES PATENTS 2,970,386  2/61  Knutson _____ 25—9.1
2,983,053  5/61  Bartholomew _____ 35—9
2,998,186  8/61  Meyer _____ 235—193 X JEROME SCHNALL, *Primary Examiner*

L. SMILOW, GEORGE NINAS, JR., *Examiners.*